Nov. 21, 1933.  S. EDWARDS  1,936,108

REVERSING DEVICE FOR THREADING TAPS

Filed Dec. 19, 1932

Inventor
STANLEY EDWARDS

Patented Nov. 21, 1933

1,936,108

UNITED STATES PATENT OFFICE 1,936,108

REVERSING DEVICE FOR THREADING TAPS

Stanley Edwards, Denver, Colo., assignor of one-half to J. D. Treece, Denver, Colo.

Application December 19, 1932
Serial No. 647,905

10 Claims. (Cl. 10—137)

This invention relates to a reversing device for power operated threading taps and has for its principal object the provision of a device which can be inserted in a power drill or drill press, between the spindle and the tap, so as to automatically reverse the direction of rotation of the tap when the threading operation is completed.

Another object of the invention is to so construct the device that it can be cheaply and easily manufactured, and so that when assembled it will occupy but a minimum of space.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Figure 1:
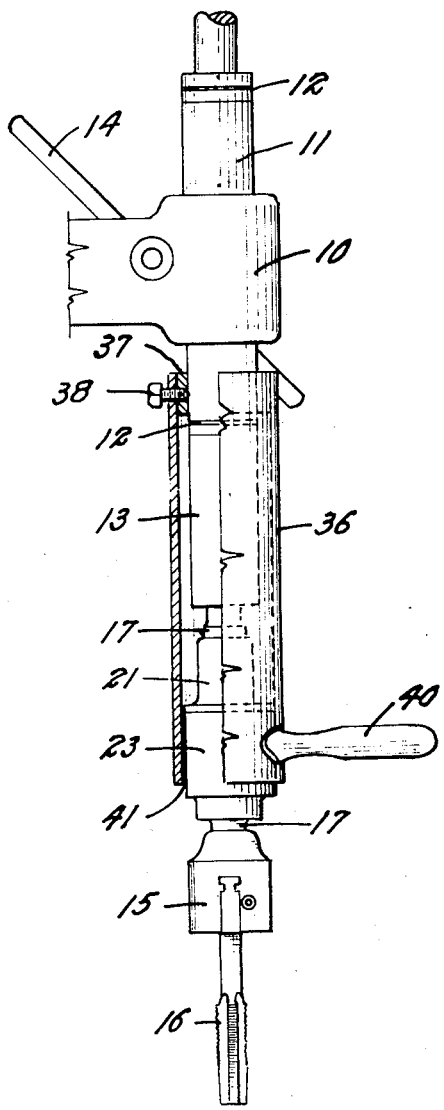
Fig. 1 illustrates the invention applied to the spindle of a typical power drill or drill press.
Figure 2:
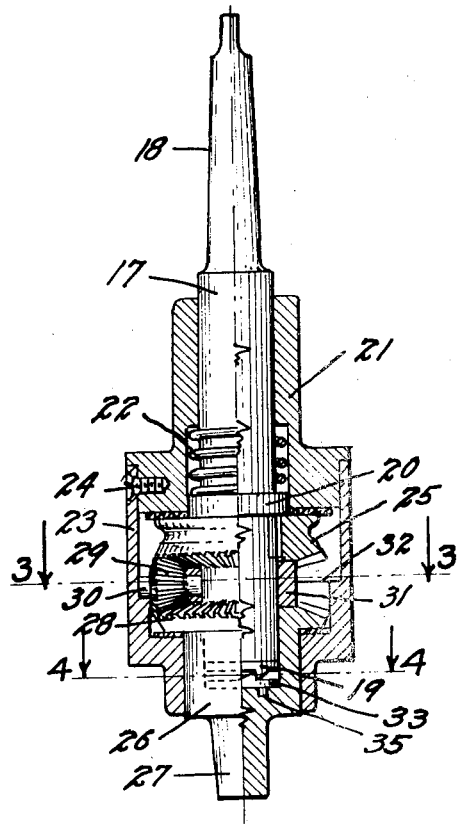
Fig. 2 is a vertical section through the invention taken on the line 2—2, Fig. 3.
Figure 3:
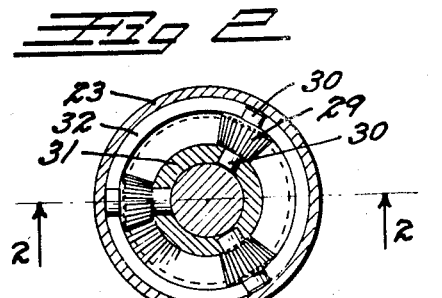
Fig. 3 is a cross section through the reversing portion of the device taken on the line 3—3, Fig. 2.

In Fig. 1, a bracket of a typical drill press is indicated at 10; the spindle sleeve at 11; spindle sleeve thrust bearings at 12; spindle at 13; and rack handle at 14. These are all standard parts of a typical power drill or drill press. The spindle is provided with a tapered socket for receiving a drill or chuck. The spindle is raised or lowered by operating the rack handle forwardly or rearwardly. A typical drill or tap chuck is indicated at 15 with a typical tap 16 therein. The invention is designed to fit into the tapered socket of the drill spindle 13 and carry the chuck 15.

The invention comprises a spindle shaft 17, the upper extremity of which is formed on a Morse taper 18 or in any other desired way to fit into the driving mechanism, such as into the spindle 13. The lower extremity of the shaft 17 is provided with a removable toothed clutch disc 19, and is provided with an annular flange 20, intermediate its extremities.

The shaft 17 is slidably mounted in a housing block 21. The block 21 is internally recessed to provide space for a compression spring 22 which acts against the annular flange 20 on the shaft 17. The housing block 21 fits into and supports a cylindrical housing 23 which may be secured to the block in any suitable manner, such as by counter-sunk, cap screws 24. Within the housing, a drive gear 25 is splined to the shaft 17 so that the latter may move axially therein but must rotate therewith.

The bottom of the housing provides a bearing for a hollow stub shaft 26, which terminates at its lower extremity in a taper shank 27, designed to fit into any of the standard drill or tap chucks such as into the chuck 15. The upper extremity of the stub shaft 26 is formed as a driven gear 28. The gears 25 and 28 are of the bevel type, and are both constantly in mesh with a series of planet pinions 29. Any desired number of planet pinions may be employed. It is preferred, however, to employ three, as illustrated.

The planet pinions 29 are formed with projecting shaft bosses 30, which extend from both faces thereof. The inner shaft bosses 30 are carried in a planet ring 31 which rotatably surrounds the shaft 17. The outer shaft bosses 30 rest in semi-cylindrical, bearing recesses formed in a shoulder 32 which projects inwardly from the inner face of the housing 23.

Figure 4:
Fig. 4 is a similar section illustrating the lower clutch face. This section is taken on the line 4—4, Fig. 2.

The stub shaft 26 is recessed to receive the lower extremity of the shaft 17, and is provided in its bottom with a removable, toothed clutch disc 33. The teeth on the clutch discs 19 and 33 are the only parts of the device which suffer materially from use. It is desired to call particular attention to the fact that when the teeth of these discs do become damaged or worn, the discs can be quickly and easily removed by removing suitable attachment screws, such as the one illustrated at 34 in Fig. 4. The discs are prevented from rotating by means of projecting pins 35 which extend from their backs into the shaft 17 or into the shaft 26.

As thus far described, the device forms a complete, practical, reversing mechanism for operating a threading tap. Let us assume that it is desired to tap a series of holes in a casting. The device is assembled as in Fig. 1 and, with the spindle 13 rotating, the rack handle 14 is actuated to bring the tap 16 into the hole to be tapped. A light pressure is applied to the rack handle 14, and the tap forms and follows its threads in the desired hole.

When the desired tapping operation has been completed, the operator reverses the rack handle 14, causing it to lift the spindle 13. The tap itself can not move upwardly since it is engaged in the newly formed threads. This causes the shaft 17 to move upwardly in the block 21 against the compression of the spring 22 and disengages the teeth of the clutch discs 19 and 33. This immediately stops the rotation of the tap for the planet gears 29 act as traction gears and travel in an orbit upon the gear 28 without transmitting any power thereto.

The housing 23 continues to rotate in the same direction as the spindle 13, but at a reduced speed. The operator may now engage the housing with his hand to retard the rotation thereof. This causes the pinions 30 to react against a gear 28 and impart a reverse rotation to the tap 16, which unscrews it from the newly formed threads. When the tap leaves the hole, the spring 22 raises the housing 23 until the teeth of the clutch discs reengage to start the tap forwardly for the next hole. The next hole can then be similarly tapped without its being necessary to stop the drill press at any time.

During the reversing operation, the operator lifts upon the rack lever 14 so as to maintain the clutch discs 19 and 33 apart. Most modern drill presses have a counter weight for supporting the weight of the spindle. This counter weight can be so adjusted that it will act to lift the spindle as soon as pressure is released from the rack lever 14. With such a change, the operator need not, of course, reverse the rack lever 14.

The stopping may be made automatic by employing any of the usual drill limit gauges upon the press table so as to engage the spindle and prevent it moving downward beyond a desired point. The action of the tap in its newly formed threads will cause the tap to be drawn downwardly in the hole until the teeth of the clutch discs separate immediately stopping the tap.

Figure 5:
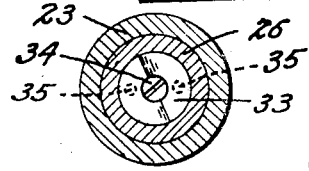
Fig. 5 is an end view of a clamping sleeve which may be employed, if desired, with the device of Fig. 2.

It has been found in actual practice that if the outer surface of the housing 23 is free from obstructions, the above braking operation can be carried out by the hand of the operator without inconvenience. Should it be desired, however, to avoid the use of the hand as a brake, a construction as illustrated in Figs. 1 and 5 may be employed. The latter comprises a gripping sleeve 36, of sufficient length to extend from the housing 23 to the spindle sleeve 11 of the drill press, and of sufficient diameter to freely surround the housing. A spacing washer 37 is usually required between the spindle sleeve and the gripping sleeve 36. A suitable set screw 38 may be provided to clamp the two sleeves together.

The sleeve 36 is split longitudinally from its bottom for a portion of its height so that its lower extremity may be contracted. This contracting is preferably done by grasping a pair of handles 40, one of which is secured to the sleeve 36 at each side of the split therein. It can be readily seen that if the handles 40 are contracted, the sleeve 36 will grip the housing 33 so as to cause it to assert the reversing action previously described. A friction band 41 of brake lining, fiber or similar wear resisting material may be secured in the contacting portion of the sleeve to eliminate wear and increase the gripping action thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A reversing device for threading taps comprising: a housing; a spindle shaft extending into said housing; said spindle shaft being longitudinally movable in said housing; a first clutch member on the inner extremity of said spindle shaft; a stub shaft extending from said housing and rotatably mounted therein; a second clutch member on said stub shaft arranged to co-act with said first clutch member; a spring acting to normally force said clutch members into engagement; a first bevel gear carried by said spindle shaft, said gear being slidably mounted on said shaft and fixed to rotate therewith; a second bevel gear on said stub shaft; and a planet pinion journalled in said housing and constantly in mesh with both said bevel gears.

2. A reversing device for threading taps comprising: a housing; a spindle shaft extending into said housing; said spindle shaft being longitudinally movable in said housing; a first clutch member on the inner extremity of said spindle shaft; a stub shaft extending from said housing and rotatably mounted therein; a second clutch member on said stub shaft arranged to co-act with said first clutch member; a spring acting to normally force said clutch members into engagement; a first bevel gear carried by said spindle shaft, said gear being slidably mounted on said shaft and fixed to rotate therewith; a second bevel gear on said stub shaft; and a planet pinion journalled in said housing and constantly in mesh with both said bevel gears, said housing acting to maintain said bevel gears in mesh with said planet pinion so that when said stub shaft is maintained stationary, said housing will be rotated by the movement of said planet pinion about its orbit.

3. A reversing device for threading taps comprising: a housing; a spindle shaft extending into said housing; said spindle shaft being longitudinally movable in said housing; a first clutch member on the inner extremity of said spindle shaft; a stub shaft extending from said housing and rotatably mounted therein; a second clutch member on said stub shaft arranged to co-act with said first clutch member; a spring acting to normally force said clutch members into engagement; a first bevel gear carried by said spindle shaft, said gear being slidably mounted on said shaft and fixed to rotate therewith; a second bevel gear on said stub shaft; and a planet pinion journalled in said housing and constantly in mesh with both said bevel gears, said housing being free to rotate about both said shafts so that when said clutch members are released, said housing may move with the travel of said planet pinion.

4. A reversing device for threading taps comprising: a housing; a spindle shaft extending into said housing; said spindle shaft being longitudinally movable in said housing; a first clutch member on the inner extremity of said spindle shaft; a stub shaft extending from said housing and rotatably mounted therein; a second clutch member on said stub shaft arranged to co-act with said first clutch member; a spring acting to normally force said clutch members into engagement; a first bevel gear carried by said spindle shaft, said gear being slidably mounted on said shaft and fixed to rotate therewith; a second bevel gear on said stub shaft; and a planet pinion journalled in said housing and constantly in mesh with both said bevel gears, said housing being free to rotate about both said shafts so that when said clutch members are released, said housing may move with the travel of said planet pinion; and means for retarding the rotation of said housing so as to cause said planet pinion to react against said bevel gears to reverse the rotation of said stub shaft.

5. A reversing device for threading taps comprising: a housing; a spindle shaft extending into said housing; said spindle shaft being longitudinally movable in said housing; a first clutch member on the inner extremity of said spindle shaft; a stub shaft extending from said housing and rotatably mounted therein; a second clutch member on said stub shaft arranged to co-act with said first clutch member; a spring acting to normally force said clutch members into engagement; a first bevel gear carried by said spindle shaft, said gear being slidably mounted on said shaft and fixed to rotate therewith; a second bevel gear on said stub shaft; a planet pinion journalled in said housing and constantly in mesh with both said bevel gears; and a planet ring rotatably mounted on said spindle shaft as a journal support for said planet pinion.

6. A reversing device for power operated threading taps comprising: a spindle shaft adapted to be rotated by a power operated device; a housing rotatably and slidably mounted on said spindle shaft; a stub shaft journalled in said housing in alignment with said spindle shaft and provided with a socket for receiving the extremity of the latter; clutch means in said socket for connecting said two shafts together; a spring acting between said spindle shaft and said housing to urge said clutch means together; a first bevel gear carried in said housing; a second bevel gear carried in said housing; said first bevel gear being slidably keyed on said spindle shaft; said second bevel gear being fixed on said stub shaft; a planet gear positioned between said bevel gears; and a journal for said planet gear in said housing so that the latter must rotate as said planet gear travels in its orbit.

7. A reversing device for power operated threading taps comprising: a spindle shaft adapted to be rotated by a power operated device; a housing rotatably and slidably mounted on said spindle shaft; a stub shaft journalled in said housing in alignment with said spindle shaft and provided with a socket for receiving the extremity of the latter; clutch means in said socket for connecting said two shafts together; a spring acting between said spindle shaft and said housing to urge said clutch means together; a first bevel gear carried in said housing; a second bevel gear carried in said housing; said first bevel gear being slidably keyed on said spindle shaft; said second bevel gear being fixed on said stub shaft; a planet gear positioned between said bevel gears; and a journal for said planet gear in said housing so that the latter must rotate as said planet gear travels in its orbit, a planet ring surrounding said spindle shaft between said bevel gears and a second journal for said planet gear in said planet ring.

8. A reversing device for power operated threading taps comprising: a spindle shaft adapted to be rotated by a power operated device; a housing rotatably and slidably mounted on said spindle shaft; a stub shaft journalled in said housing in alignment with said spindle shaft and provided with a socket for receiving the extremity of the latter; clutch means in said socket for connecting said two shafts together; a spring acting between said spindle shaft and said housing to urge said clutch means together; a first bevel gear carried in said housing; a second bevel gear carried in said housing; said first bevel gear being slidably keyed on said spindle shaft; said second bevel gear being fixed on said stub shaft; a planet gear positioned between said bevel gears; and a journal for said planet gear in said housing so that the latter must rotate as said planet gear travels in its orbit, a planet ring surrounding said spindle shaft between said bevel gears and a second journal for said planet gear in said planet ring; fixed thrust bearings for said bevel gears in said housing so as to maintain them in fixed, spaced relation as said housing is moved along said spindle shaft.

9. A reversing device for threading taps comprising: a housing; a spindle shaft extending into said housing; said spindle shaft being longitudinally movable in said housing; a first clutch member on the inner extremity of said spindle shaft; a stub shaft extending from said housing and rotatably mounted therein; a second clutch member on said stub shaft arranged to co-act with said first clutch member; a spring acting to normally force said clutch members into engagement; a first bevel gear carried by said spindle shaft, said gear being slidably mounted on said shaft and fixed to rotate therewith; a second bevel gear on said stub shaft; and a planet pinion journalled in said housing and constantly in mesh with both said bevel gears, said housing being free to rotate about both said shafts so that when said clutch members are released, said housing may move with the travel of said planet pinion; and means for retarding the rotation of said housing so as to cause said planet pinion to react against said bevel gears to reverse the rotation of said stub shaft; said latter means comprising: a contractible sleeve surrounding said housing; means for affixing one extremity of said sleeve to a fixed support so that when the other extremity is contracted it will act as a brake against said housing.

10. A reversing device for use in a power drill for reversing a tap chuck comprising: a spindle shaft; a tapered upper extremity on said spindle shaft to fit into said power drill; a first clutch member on the lower extremity of said spindle shaft; an annular flange projecting from said spindle shaft intermediate the extremities of the latter; a housing block rotatably and slidably mounted on said spindle shaft and provided with an internal recess about said shaft; a compression spring acting between said flange and said block; a cylindrical housing secured to and projecting below said housing block; a drive gear splined to said spindle shaft within said housing so that it may move axially on said shaft; a bearing in the bottom of said housing; a stub shaft journalled in said latter bearing; a taper shank on said stub shaft to receive said chuck, said stub shaft being provided with a socket in its upper extremity for receiving the lower extremity of said spindle shaft; a driven gear formed on the upper extremity of said stub shaft; a series of planet pinions interposed between said drive and driven gears; planet shafts projecting from both faces of said planet pinions; a planet ring rotatably surrounding said spindle shaft between said gears and acting as a journal for the planet shafts on the inner face of said planet pinions; a shoulder projecting inwardly from the inner face of said housing; semi-cylindrical bearing recesses formed in said shoulder for receiving the planet shafts on the outer faces of said planet pinions; and a second clutch member in the bottom of the socket in said stub shaft arranged to be brought into contact with said first clutch member by the expansion of said compression spring.

STANLEY EDWARDS.